United States Patent
Nakagawa (10) Patent No.: US 9,049,417 B2
(45) Date of Patent: Jun. 2, 2015

(54) PSEUDO-VIDEO CREATION DEVICE, PSEUDO-VIDEO CREATION METHOD, AND PSEUDO-VIDEO CREATION PROGRAM

(75) Inventor: Toshiaki Nakagawa, Shizuoka (JP)

(73) Assignee: KOWA COMPANY, LTD., Aichi (JP)

( * ) Notice: Subject to any disclaimer, the term of this patent is extended or adjusted under 35 U.S.C. 154(b) by 0 days.

(21) Appl. No.: 13/976,609

(22) PCT Filed: Dec. 5, 2011

(86) PCT No.: PCT/JP2011/078035
§ 371 (c)(1),
(2), (4) Date: Jun. 27, 2013

(87) PCT Pub. No.: WO2012/090648
PCT Pub. Date: Jul. 5, 2012

(65) Prior Publication Data
US 2013/0279885 A1      Oct. 24, 2013

(30) Foreign Application Priority Data

Dec. 28, 2010   (JP) .................................. 2010-291599

(51) Int. Cl.
| | |
|---|---|
| *H04N 5/932* | (2006.01) |
| *H04N 9/87* | (2006.01) |
| *G06T 13/80* | (2011.01) |
| *G06T 15/50* | (2011.01) |
| *H04N 5/265* | (2006.01) |

(52) U.S. Cl.
CPC *H04N 9/87* (2013.01); *G06T 13/80* (2013.01); *G06T 15/503* (2013.01); *H04N 5/265* (2013.01)

(58) Field of Classification Search
None
See application file for complete search history.

(56) References Cited

U.S. PATENT DOCUMENTS

| | | | |
|---|---|---|---|
| 2002/0002077 A1 | 1/2002 | Shimizu et al. | |
| 2009/0298547 A1* | 12/2009 | Kim et al. | 455/566 |
| 2010/0045570 A1* | 2/2010 | Takata | 345/4 |

FOREIGN PATENT DOCUMENTS

| | | |
|---|---|---|
| JP | 2008-217493 A | 9/2008 |
| JP | 2009-88578 A | 4/2009 |

OTHER PUBLICATIONS

Int'l Search Report, Dec. 27, 2011, JPO.
"Fondu-Wikipedia", Wikipedia, (Sep. 14, 2010), XP055126916, Paragraph: "le fondu enchaine"; p. 2; (Retrieved on Jul. 4, 2014).

* cited by examiner

*Primary Examiner* — William C Vaughn, Jr.
*Assistant Examiner* — Eileen Adams
(74) *Attorney, Agent, or Firm* — Duane Morris LLP (57) ABSTRACT

[Problem] To make it easy to grasp how an object has changed over time.
[Solution] Let "one still image" and "the other still image" refer to two still images taken of one object at different times. In the present invention, the "other still image" is superimposed on top of the "one still image" and the transparency of the other still image is varied as shown in FIG. 2(*a*) or (*b*). The displayed still image thus gradually changes from one to the other, resulting in the creation of a pseudo-video from said two still images. This makes it easier, in comparison to simply lining up the two still images and comparing them (that is, comparing the two still images to each other and looking for places in which change over time occurred), to grasp how the object changed over time.

12 Claims, 5 Drawing Sheets

PSEUDO-VIDEO CREATION DEVICE, PSEUDO-VIDEO CREATION METHOD, AND PSEUDO-VIDEO CREATION PROGRAM

CROSS-REFERENCE TO RELATED PATENT APPLICATIONS

The present application is a U.S. national stage application under 35 U.S.C. §371 of PCT Application No. PCT/JP2011/078035, filed Dec. 5, 2011, which claims priority to JP 2010-291599 filed on Dec. 28, 2010, the entireties of which are incorporated by reference herein.

TECHNICAL FIELD

This invention relates to a pseudo-video creation device, a pseudo-video creation method and pseudo-video creation program that create a pseudo-video showing a change of an object with passage of time with two or more still images taken of the same object at different times.

BACKGROUND ART

Generally, an animation with a video camera is conventionally used for recording the change over time (that is, the record of the change with passage of time regarding positions, shapes and colors of a certain object), but still images with a digital camera are used for recording the change for a longer time, such as several days and several months in some cases. In a field of medical treatment, for example, a degree of progression of condition and postoperative recovery degree are diagnosed by comparing two or more photographs irregularly obtained, such as fundus photographs. But, its comparison work is complex since two or more still images being in line should be compared with each other, and it is not easy to grasp the change with passage of time.

Then, as a method of solving such a problem, a method of composing a pseudo-video that shows the change of the object with passage of time with two or more still images has been proposed (see patent related document 1). Concretely speaking, it is possible to easily grasp the change of the object with passage of time in such a manner that two images (a former image and a later image) are superimposed, and the former image is gradually switched into the later image by gradually changing a transparency of the later image from 0% to 100%.

PRIOR ART

Patent Related Document

[Patent related document 1]: Japanese patent application publication No. 2008-217493

SUMMARY OF INVENTION

Problems to be Solved by Invention

In a technique mentioned in patent related document 1, it is not possible to adjust amount of change of the transparency and such amount is constant. Due to this reason, all pseudo-videos composed have the same length (that is, any pseudo-video has the same time length from the change start to the change end of the transparency), and it is not possible to change the length of the pseudo-video.

An object of the invention is to provide a pseudo-video creation device, a pseudo-video creation method and pseudo-video creation program that can solve the above-mentioned problems.

Means for Solving Problems

Figure 1:
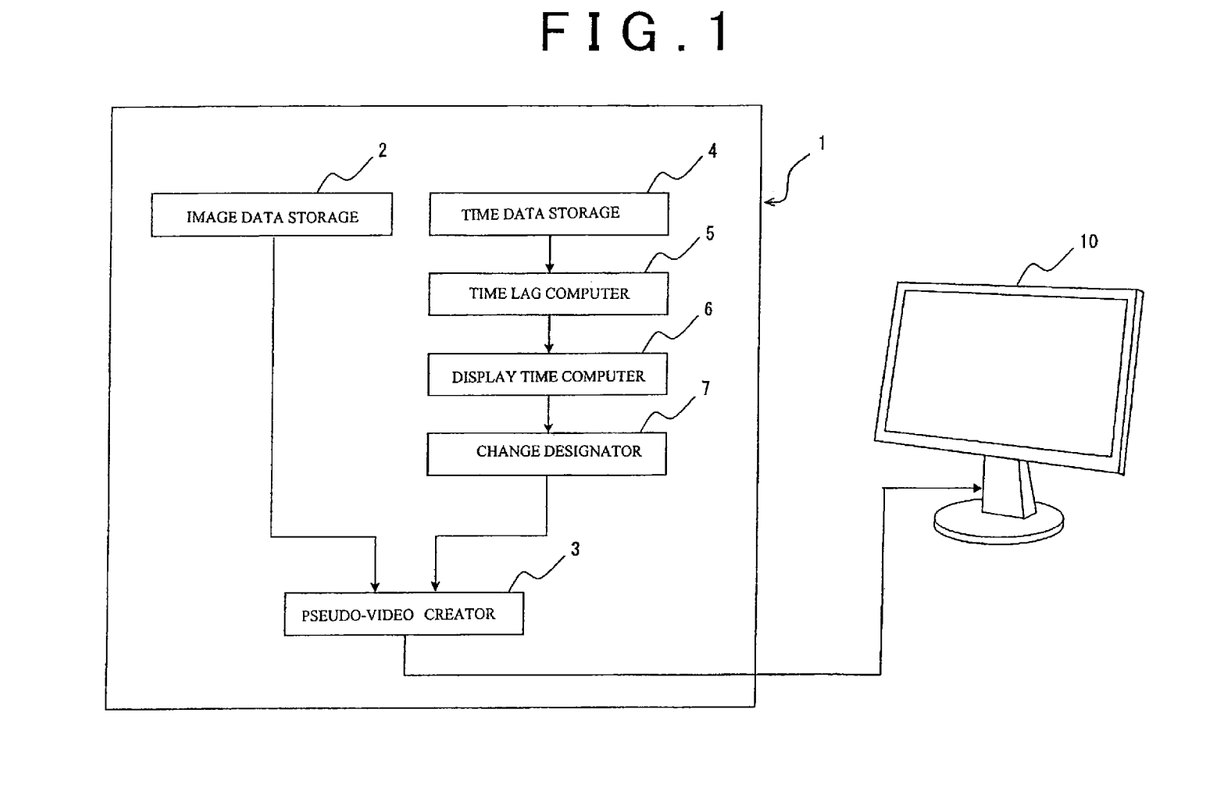
FIG. 1 is a block diagram that shows an instance of a structure of a pseudo-video creation device according to the invention.
Figure 2:
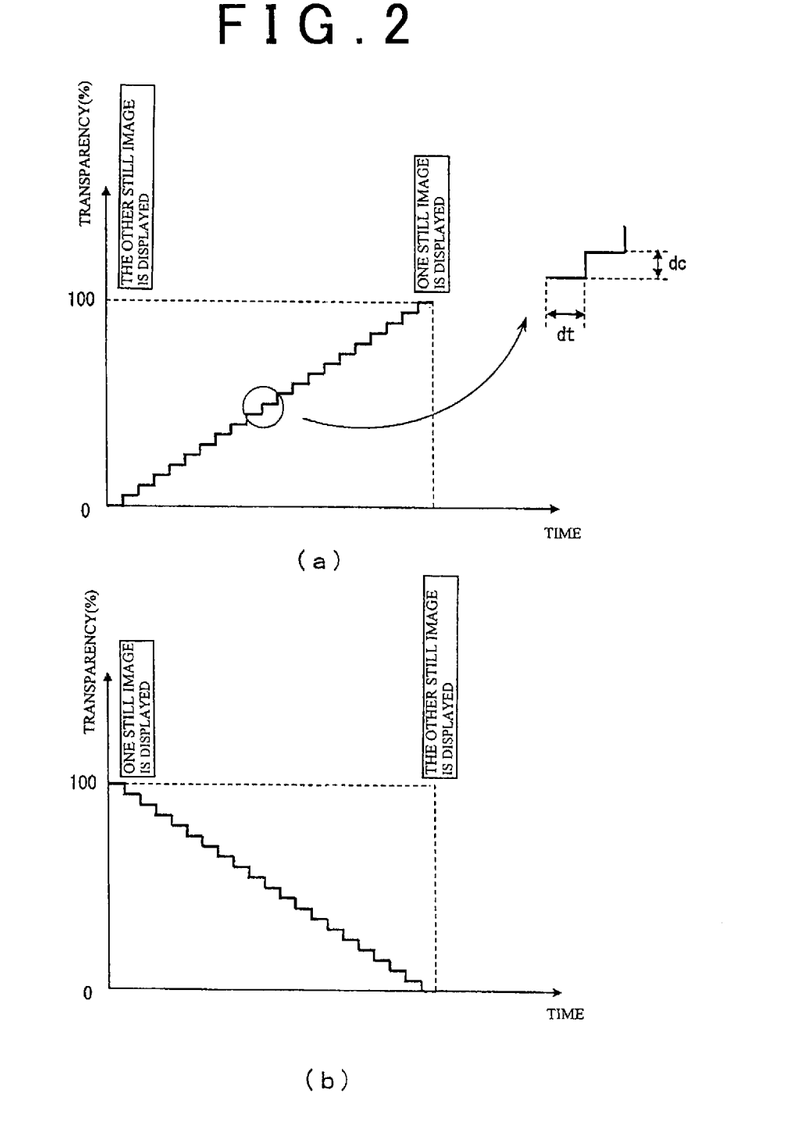
Figure 3:
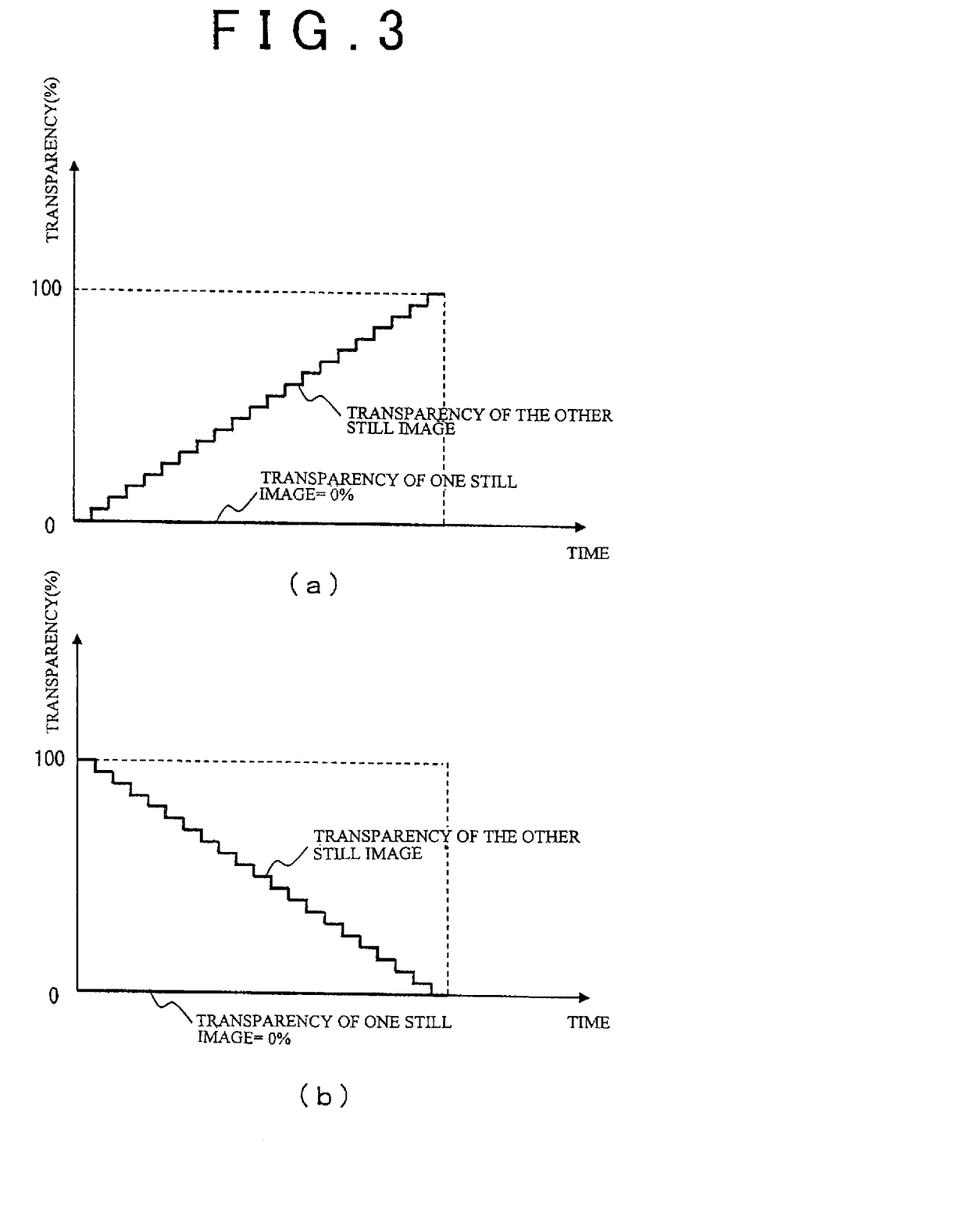
Figure 4:
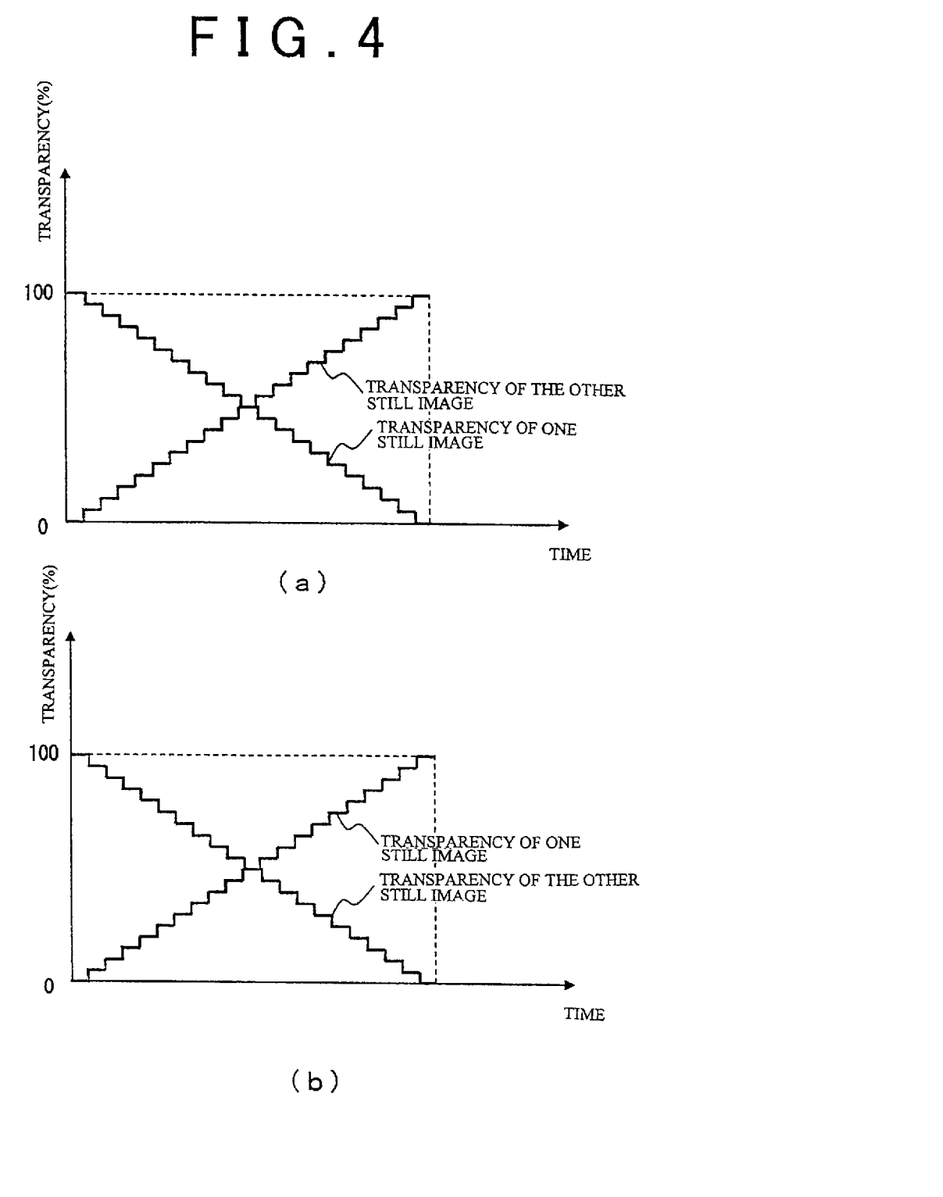

According to an embodiment of the present disclosure exemplarily shown in FIG. 1 is a pseudo-vide creation device (1) that creates pseudo-video showing change of an object with passage of time with two or more still images obtained by taking the same object at different times, comprising:

an image data storage (2) that stores the two or more still images as image data;

a pseudo image creator (3) that creates the pseudo-video in such a manner that upon receiving image data from the image data storage (2), the other still image is displayed so as to be superimposed on top of one still image and change its transparency by predetermined amount ("the transparency amount of change") whenever a predetermined time passes; and a change designator (7) that designates the transparency amount of change.

In some embodiments of the disclosed pseudo-video creation device, the transparency amount of change is set almost constant between change start and change end of the transparency of the other still image.

In some embodiments, the disclosed pseudo-video creation device, further comprises display time computer (6) that computes display time $\Delta T$ of the pseudo-video by the following equation $$\Delta T \approx k \Delta t \, (k \text{ is constant}) \qquad [\text{Equation 1}]$$

if photograph time lag that is a difference between photography time of one still image and photography time of the other still image is $\Delta t$, the change designator (7) designates the transparency amount of change so that the time from the change start to the change end of the transparency of the other still image can correspond with the display time $\Delta T$ computed through the display time computer (6).

In some embodiments, the disclosed pseudo-video creation device, further comprises:

a time data storage (4) that stores photography time of each still image as time data; and a time lag computer (5) that computes the photography time lag $\Delta t$ based upon the time data stored in the time data storage (4);

wherein the display time computer (6) computes the display time $\Delta T$ of the pseudo-video based upon the photography time lag $\Delta t$ computed through the time lag computer (5).

In some embodiments of the disclosed pseudo-video creation device, if the two or more still images are referred to as "first still image", "second still image" and "third still image" in the photography order, the pseudo video creator (3) creates a first pseudo-video wherein the image is gradually switched from the first still image into the second still image in such a manner that the other still image is displayed so as to be superimposed on top of one still image of the first still image and the second still image, changing its transparency, and a second pseudo-video wherein the image is gradually switched from the second still image into the third still image in such a manner that the other still image is displayed so as to be superimposed on top of one still image of the second still image and the third still image, changing its transparency; and the display time computer (6) computes the first display time $\Delta T1$ that is the display time of the first pseudo-video and the second display time ΔT2 that is the display time of the second pseudo-video so as to meet the following equation $$\Delta T1 : \Delta T2 \approx \Delta t1 : \Delta t2 \quad \text{[Equation 2]}$$

wherein Δt1 is a photography time lag between the photography time of the first still image and the photography time of the second still image, and Δt2 is a photography time lag between the photography time of the second still image and the photography time of the third still image.

According o an aspect of the present discloseure a pseudo-video creation method is disclosed. The method is of creating pseudo-video showing change of an object with passage of time with two or more still images obtained by taking the same object at different times, comprising:

a step of storing two or more still images as image data,
  a step of creating the pseudo-video in such a manner that with the stored image data, the other still image is displayed so as to be superimposed on top of one still image, changing its transparency by predetermined amount ("the transparency amount of change") whenever a predetermined time passes; and
  a step of designating the transparency amount of change.

In some embodiments of the pseudo-video creation method, wherein the transparency amount of change is set almost constant between change start and change end of the transparency of the other still image.

Some embodiments of the pseudo-video creation method, further comprising a step of computing the display time ΔT of the pseudo-video by the following equation if the photography time lag Δt that is the different between the photography time of one still image and the photography time of the other still image is Δt $$\Delta T \approx k \Delta t \ (k \text{ is constant}) \quad \text{[Equation 3]}$$

wherein the transparency amount of change is designated so that the time from the change start and the change end of the transparency of the other still image almost corresponds with the computed display time ΔT.

In some embodiments, the pseudo-video creation method, further comprises a step of storing photography time of each still image as time data; and
  a step of computing the photography time lag Δt based upon the stored time data, wherein the display time ΔT is computed based upon the computed photography time lag Δt.

In some embodiments of the pseudo-video creation method, wherein if the two or more still images are referred to as "first still image", "second still image" and "third still image" in the photography order, in the step of creating the pseudo video, a first pseudo-video in which the first still image is gradually switched into the second still image is created in such a manner that the other still image is displayed, being superimposed on top of one of the first still image and the second still image and varying the transparency, and the second pseudo-video in which the second still image is gradually switched into the third still image is created in such a manner that the other still image is displayed, being superimposed on top of one of the second still image and the third still image and varying the transparency; and
  in the step of computing the display time, the first display time ΔT1 that is the display time of the first pseudo-video and the second display time ΔT2 that is the display time of the second pseudo-video are computed so as to meet the following equation $$\Delta T1 : \Delta T2 \approx \Delta t1 : \Delta t2 \quad \text{[Equation 4]}$$

wherein Δt1 is a photography time lag between the photography time of the first still image and the photography time of the second still image, and Δt2 is a photography time lag between the photography time of the second still image and the photography time of the third still image.

According to another aspect, a pseudo-video creation program is disclosed. The pseudo-video creation program creates pseudo-video showing change of an object with passage of time with two or more still images obtained by taking the same object at different times:

the pseudo-video creation program gets a computer to function as followings:
  an image data storage (2) that stores the two or more still images as image data,
  a pseudo image creator (3) that creates the pseudo-video in such a manner that upon receiving image data from the image data storage (2), the other still image is displayed so as to be superimposed on top of one still image, changing its transparency by predetermined amount ("the transparency amount of change") whenever a predetermined time passes; and
  a change designator (7) that designates the transparency amount of change.

According to an embodiment of the pseudo-video creation program, the transparency amount of change is set almost constant between change start and change end of the transparency of the other still image.

According to an embodiment, the pseudo-video creation program includes, further getting the computer to function as a display time computer (6) that computes display time ΔT of the pseudo-video by the following equation $$\Delta T \approx k \Delta t \ (k \text{ is constant}) \quad \text{[Equation 5]}$$

if photograph time lag that is a difference between photography time of one still image and photography time of the other still image is Δt, the change designator (7) designates the transparency amount of change so that the time from the change start to the change end of the transparency of the other still image almost corresponds with the display time ΔT computed through the display time computer (6).

In some embodiments, the pseudo-video creation program includes, further getting the computer to function as a time data storage (4) that stores photography time of each still image as time data; and
  a time lag computer (5) that computes the photography time lag Δt based upon the time data stored in the time data storage (4);
  wherein the display time computer (6) computes the display time ΔT of the pseudo-video based upon the photography time lag Δt computed through the time lag computer (5).

In some embodiments of the pseudo-video creation program, if the two or more still images are referred to as "first still image", "second still image" and "third still image" in the photography order, the pseudo-video creator (3) creates a first pseudo-video wherein the image is gradually switched from the first still image into the second still image in such a manner that the other still image is displayed so as to be superimposed on top of one still image of the first still image and the second still image, changing its transparency, and a second pseudo-video wherein the image is gradually switched from the second still image into the third still image in such a manner that the other still image is displayed so as to be superimposed on top of one still image of the second still image and the third still image, changing its transparency; and
  the display time computer (6) computes the first display time ΔT1 that is the display time of the first pseudo-video and the second display time ΔT2 that is the display time of the second pseudo-video so as to meet the following equation $$\Delta T1 : \Delta T2 \approx \Delta t1 : \Delta t2 \quad \text{[Equation 6]}$$

wherein Δt1 is a photography time lag between the photography time of the first still image and the photography time of the second still image, and Δt2 is a photography time lag between the photography time of the second still image and the photography time of the third still image.

The number in parentheses shows the corresponding element in the drawings for the sake of convenience, accordingly, the descriptions are not restricted and bound by the descriptions on the drawings.

Effects of Invention

According to some embodiments of the present disclosure the transparency of the other still image is varied by predetermined amount (that is, the transparency amount of change), so that it is possible to obtain the pseudo-video wherein one still image and the other still image are naturally switched. When watching such a pseudo-video, it is possible to relatively easily grasp the state before change with passage of time, the state after change with passage of time and portions that changed with passage of time, in comparison to watching two or more still images. Besides, the transparency amount of change can be designated through the change designator, and the time from the change start to the change end of the transparency of the other still image (that is, the length of the pseudo-video) can be lengthened or shortened according to its necessity thereby.

According to some embodiments of the invention disclosed herein in the pseudo-video created with two sheets of images which the photography time lag Δt is "one year", the display time becomes one almost proportional to "one year", and in the pseudo-video created with two sheets of images which the photography time lag is "half year", the display time becomes one almost proportional to "half year", so that a length of the actual photography time lag Δt can be reflected at the display time ΔT of the pseudo-video. At the result, it is possible to grasp whether the actual change goes slowly or fast by only comparing these pseudo-videos.

According to some embodiments of the invention disclosed herein the still image is gradually switched, and it is possible to grasp the change of the object over time without fail.

According to some embodiments of the invention disclosed herein even if the first through third still images are irregularly taken (that is, even if the photography time lag Δt1 and the photography time lag Δt2 are not equal to each other), it is possible to obtain the pseudo-video, taking such a point into consideration (that is, the pseudo-video in which the passage of time of the displayed object is almost constant), and to realistically reproduce the change of the object with passage of time.

BRIEF DESCRIPTION OF DRAWINGS

FIG. 2 (a), (b) are views that show changes of transparency of the other still image.

FIG. 3(a), (b) are views that show changes of transparency of one still image and the other still image.

FIG. 4(a), (b) are views that show changes of transparency of one still image and the other still image.

EMBODIMENTS FOR CARRYING OUT THE INVENTION

Embodiments of the invention are now mentioned, referring to appended drawings FIGS. 1 to 4.

A pseudo-video creation device according to the invention is a device that creates a pseudo-video showing a change of an object with passage of time with two or more still images taken from the same object at different times.

A pseudo-video creation device according to the invention exemplarily shown with a reference number 1 in FIG. 1 has an image data storage 2 that stores the two or more still images as image data, and a pseudo-video creator 3 that creates a pseudo-video upon receiving the image data from the image data storage 2. Such pseudo-video creator 3 is structured in such a manner that the other still image is displayed so as to be superimposed on top of one still image, and when displaying the other still image, its transparency is gradually varied. Concretely speaking, there are two forms, (a) the transparency of the other still image is firstly set low and the transparency is raised by predetermined amount dc ("the transparency amount of change" hereinafter) whenever a predetermined time dt ("the unit time" hereinafter) passes (for example, the transparency is varied from almost 0% to almost 100% in the shape of steps as exemplarily shown in FIG. 2(a)) and (b) the transparency of the other still image is firstly set high and the transparency is lowered by predetermine amount (the transparency amount of change) whenever the unit time passes (for example, the transparency is varied from almost 100% to almost 0% in the shape of steps as exemplarily shown in FIG. 2(b)). And, the transparency amount of change can be designated through a change designator 7. Such a change designator 7 is means for designating the transparency amount of change through an manual operation by an operator (well-known switches, such as volume switches and slide switches), and means for automatically designating the transparency amount of change based upon certain data (details is mentioned hereinafter). In a case of the above-mentioned (a), the pseudo-video is created in such a manner that firstly the other still image is visible, and the other still image is gradually switched into one still image, and the still image which photography time is old is made the other still image and the still image which photography time is new is made one still image, so that the pseudo-video showing the change of the object with passage of time can be created. On the other hand, in case of the above-mentioned (b), the pseudo-video is created in such a manner that firstly one still image is visible, and one still image is gradually switched into the other still image, and the still image which photography time is old is made one still image and the still image which photography time is new is made the other still image, so that the pseudo-video showing the change of the object with passage of time can be created.

According to the invention, it is relatively easily grasp a state before the change with passage of time, a state after the change with passage of time, and portions which changed with passage of time by watching the above-mentioned pseudo-video in comparison with an observation watching of two or more sheets of still images. Besides, the transparency amount of change can be designated by the change designator 7, and it is possible to lengthen and shorten the time between change start and change end of the transparency of the other still image (that is, the length of the pseudo-video) according to its necessity.

If one still image is not visible under cover of the other still image when the transparency of the other still image is 0%, the transparency of one still image may be constant without changing (preferably, be constant at almost 0%) (see FIG. 3(a), (b)). But, if one still image is visible even if the transparency of the other still image is 0% (for example, in a case where the image of the object in the still image taken later protrudes from the image of the object in the still image taken before since the position or the shape of the object is changed with passage of time), the transparency of one still image may be properly changed (see FIGS. 4 (a) and (b)).

Preferably, the above-mentioned transparency amount of change dc may be set so as to be almost constant between the change start and the change end of the transparency of the other still image. If the transparency is varied without being constant, the change of the object with passage of time may not be fully grasped due to a sudden switching from one still image to the other still image (or from the other still image to one still image). But, in a case where the transparency amount of change is made almost constant without changing, it is possible to grasp the change of the object with passage of time more surely since the still image is gradually switched.

Preferably, the pseudo-video creation device 1 according to the invention is provided with a display time computer 6 of FIG. 1 that computes display time ΔT of the pseudo-video with a following equation.

$$\Delta T \approx k \Delta t \quad \text{[Equation 7]}$$

wherein Δt is a difference between a photography time of one still image and a photography time of the other still image (photography time lag), and k is a constant.

Preferably, the change designator 7 designates the transparency amount of change so as to correspond the time from the change start to the change end of the transparency of the other still image with the display time ΔT computed through the display time computer 6. In such a case, preferably, a time data storage 4 that stores the photography time of the each still image as time data and a time lag computer 5 that computes the photography time lag Δt based upon the time data stored in the time data storage 4 are provided so that the display time computer 6 can compute the display time ΔT of the pseudo-video based upon the photography time lag Δt computed through the time lag computer.

In the above-mentioned case, in the pseudo-video created with two sheets of images which the photography time lag Δt is "one year", the display time becomes one almost proportional to "one year", and in the pseudo-video created with two sheets of images which the photography time lag is "half year", the display time becomes one almost proportional to "half year", so that a length of the actual photography time lag Δt can be reflected at the display time ΔT of the pseudo-video. At the result, it is possible to grasp whether the actual change goes slowly or fast by only comparing these pseudo-videos.

The pseudo-video creator 3 displays the other still image superimposed on top of one still image, (that is, the two still images are overlapped), and a well-known technique may be used for its positioning.

The pseudo-video may be created with three still images. The three still images are now referred to as "first still image", "second still image" and "third still image" in the photography order. In such a case, the pseudo-video creator 3 creates one pseudo-video ("the first pseudo-video" hereinafter) with the first still image and the second still image, and creates the other pseudo-video ("the second pseudo-video" hereinafter) with the second still image and the third still image. If the first and second pseudo-videos are connected and the connected one is displayed, it is possible to obtain the pseudo-video of the object that changes with passage of time in order of the first still image, the second still image and the third still image.

Concretely speaking, the pseudo-video creator 3 may create the first pseudo-video in which the first still image is gradually switched into the second still image in such a manner that the other still image is displayed, being superimposed on top of one of the first still image and the second still image and varying the transparency (that is, (that is, the transparency is gradually raised or gradually lowered), and may create the second pseudo-video in which the second still image is gradually switched into the third still image in such a manner that the other still image is displayed, being superimposed on top of one of the second still image and the third still image and varying the transparency (that is, (that is, the transparency is gradually raised or gradually lowered).

In such a case, the display time computer 6 may compute the first display time ΔT1 that is the display time of the firstpseudo-videoandthesecond display time ΔT2 that is the display time of the second pseudo-video so as to meet the equation shown below.

$$\Delta T1 : \Delta T2 \approx \Delta t1 : \Delta t2 \quad \text{[Equation 8]}$$

wherein Δt1 is the photography time lag between the photography time of the first still image and the photography time of the second still image, and Δt2 is the photography time lag between the photography time of the second still image and the photography time of the third still image.

Even if the first through third still images are irregularly taken in the above-mentioned structure (that is, even if the photography time lag Δt1 and the photography time lag Δt2 are not equal to each other), it is possible to obtain the pseudo-video, taking such a point into consideration (that is, the pseudo-video in which the passage of time of the displayed object is almost constant), and to realistically reproduce the change of the object with passage of time.

A monitor 10 may be connected with the above-mentioned pseudo-video creation device 1 so as to display the pseudo-video created through the device 1. Besides, the pseudo-video created through the device 1 may be stored in a portable memory (such as, a USB memory) as a video data file in forms of AVI, DCR, DIR, DXR, MPEG, MOV, for example so as to be reproduced by another reproduction device, such as a computer and a DVD player.

On the other hand, a method of creating the pseudo-video according to the invention is to create the pseudo-video showing the change of the object with passage of time with two or more still images obtained by taking the same object at different times.

The method of creating the pseudo-video has a step of storing the two or more sheets of still images as image data, a step of creating the pseudo-video with the stored image data, and a step of designating the transparency amount of change at the time of creating the pseudo-video. Such a creation of the pseudo-video in this case is mentioned before. The transparency amount of change may be made almost constant between the change start and the change end of the transparency of the other still image.

Furthermore, in the method of creating the pseudo-video according to the invention, a step of computing the display time ΔT of the pseudo-video with the below-mentioned equation may be executed. The transparency amount of change may be designated so that the time from the change start to the change end of the transparency of the other still image almost corresponds with the computed display time ΔT.

$$\Delta T \approx k \Delta t \,(k \text{ is constant}) \quad \text{[Equation 9]}$$

wherein Δt is a difference (photography time lag) between the photography time of one still image and the photography time of the other still image.

By executing a step of storing the photography time of each still image as time data and a step of computing the photography time lag Δt based upon the stored time data, the display time ΔT may be computed based upon the computed photography time lag Δt.

The pseudo-video may be created with the three still images (the first through the third still images), as mentioned above. In such a case, in the step of creating the pseudo-video, preferably, the first pseudo-video in which the first still image is gradually switched into the second still image is created in such a manner that the other still image is displayed, being superimposed on top of one of the first still image and the second still image and varying the transparency (that is, the transparency is gradually raised or gradually lowered), and the second pseudo-video in which the second still image is gradually switched into the third still image is created in such a manner that the other still image is displayed, being superimposed on top of one of the second still image and the third still image and varying the transparency (that is, the transparency is gradually raised or gradually lowered). Besides, in the step of computing the display time, preferably, the first display time ΔT1 that is the display time of the first pseudo-video and the second display time ΔT2 that is the display time of the second pseudo-video are computed so as to meet the flowing equation.

$$\Delta T1 : \Delta T2 \approx \Delta t1 : \Delta t2 \qquad \text{[Equation 10]}$$

wherein Δt1 is the photography time lag between the photography time of the first still image and the photography time of the second still image, and Δt2 is the photography time lag between the photography time of the second still image and the photography time of the third still image.

On the other hand, pseudo-video creation program according to the invention is one that creates the pseudo-video showing the change of the object with passage of time with two or more still images obtained by taking the same object at different times.

The program gets a computer to function as an image data storage 2 that stores the two or more still images as image data, a time data storage 4 that stores the photography time of each still image as time data, a pseudo-video creator 3 that creates the pseudo-video by displaying the other still image, being superimposed on top of the one still image and changing the transparency by predetermined amount ("the transparency amount of change" hereinafter) whenever scheduled time (the unit time) passes (that is, the transparency is gradually raised or gradually lowered) upon receiving the image data from the image data storage 2, and a change designator 7 that designates the transparency amount of change. As mentioned before, preferably, the transparency amount of change may be set almost constant between the change start and the change end of the transparency of the other still image.

The pseudo-video creation program according to the invention may also get the computer to function as the display time computer 6 that computes the display time ΔT of the pseudo-video by the following equation. And, the change designator 7 may designate the transparency amount of change such that the time between the change start and the change end of the transparency of the other still image corresponds with the display time ΔT computed through the display time computer 6.

$$\Delta T \approx k \Delta t \, (k \text{ is constant}) \qquad \text{[Equation 11]}$$

wherein Δt is the photography time lag between the photography time of one still image and the photography time of the other still image.

Furthermore, the pseudo-video creation program according to the invention may get the computer to function as the time data storage 4 that stores the photography time of each still image as the time data, the time lag computer 5 that computes the photography time lag Δt based upon the time data stored in the time data storage. And, the display time computer 6 may compute the display time ΔT of the pseudo-video based upon the photography time lag Δt computed through the time lag computer 5.

The pseudo-video may be created with the three still images (the first through the third still images), as mentioned above. In such a case, the pseudo-video creator 3 may create the first pseudo-video in which the first still image is gradually switched into the second still image in such a manner that the other still image is displayed, being superimposed on top of one of the first still image and the second still image and varying the transparency (that is, the transparency is gradually raised or gradually lowered), and the second pseudo-video in which the second still image is gradually switched into the third still image in such a manner that the other still image is displayed, being superimposed on top of one of the second still image and the third still image and varying the transparency (that is, the transparency is gradually raised or gradually lowered). And, the display time computer 6 may compute the first display time ΔT1 that is the display time of the first pseudo-video and the second display time ΔT2 that is the display time of the second pseudo-video so as to meet the following equation.

$$\Delta T1 : \Delta T2 \approx \Delta t1 : \Delta t2 \qquad \text{[Equation 12]}$$

wherein Δt1 is the photography time lag between the photography time of first still image and the photography time of the second still image, and Δt2 is the photography time lag between the photography time of the second still image and the photography time of the third still image.

First Embodiment

One embodiment of the invention is now mentioned.

In such an embodiment, a picture of one object was taken three times and three still images were obtained (three are referred to as the first still image, the second still image and the third still image in the photography order). An interval between the first and the second photography (the photography time lag) was a half year, and an interval between the second and the third photography (the photography time lag) was one year.

In the above-mentioned pseudo-video creation device 1, the time lag computer 5 computes that the photography time lag Δt1 between the photography time of the first still image and the photography time of the second still image is a half year and the photography time lag Δt2 between the photography time of the second still image and the photography time of the third still image is one year, and the display time computer 6 computes the first display time ΔT1 and the second display time ΔT2 so as to meet the following equation.

$$\Delta T1 : \Delta T2 \approx \Delta t1 : \Delta t2 \qquad \text{[Equation 13]}$$

Figure 5:
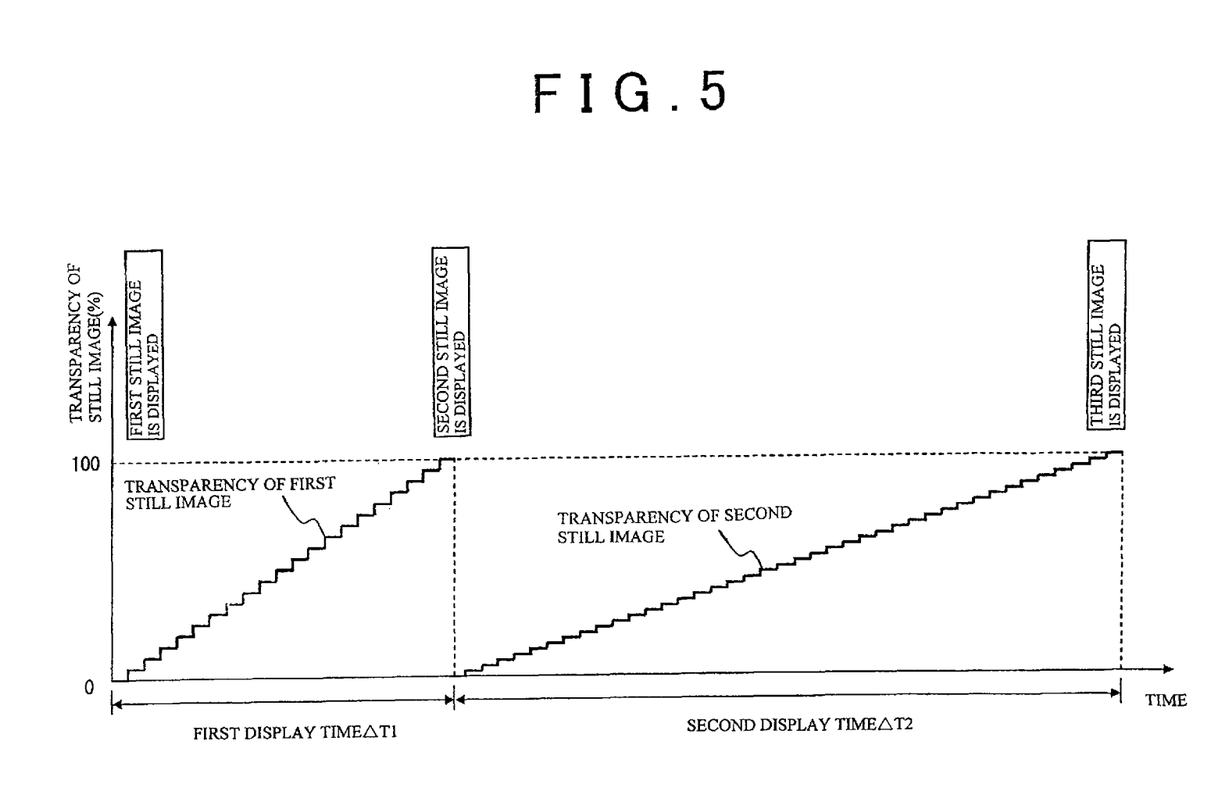
FIG. 5 is a view that shows change of transparency when switching three still images.

The change designator 7 designates the transparency amount of change of the transparency such that the time between the change start and the change end of the transparency of each still image almost corresponds with the above-mentioned display time. In this embodiment, a ratio of the first display time ΔT1 and the second display time ΔT2 is 1:2, so that the ratio of the transparency amount of change dc1 in the first display time ΔT1 and the transparency amount of change dc2 in the second display time ΔT2 is 2:1. For example, as exemplarily shown in FIG. 5, the transparency is changed in the shape of steps by 5% from 0% to 100% in the first display time ΔT1, and the transparency is changed in the shape of steps by 2.5% from 0% to 100% in the second display time ΔT2. In a case where a unit time (that is, the time when the transparency is kept constant) is dt, the first display time ΔT1=20dt, and the second display time ΔT2=40dt, and the whole display time is 60dt.

In this embodiment, the first and the second still images are not regularly taken, and the photography time lag Δt1 and the photography time lag Δt2 are not equal to each other, but the pseudo-video is created, taking such a point into consideration. Then, it is possible to realistically reproduce the change of the object with passage of time.

Second Embodiment

In the first embodiment, the transparency amount of change dc1 in the first display time ΔT1 may be 4%, not 5%. In such a case, if the ratio of the transparency amount of change dc1 in the first display time ΔT1 and the transparency amount of change dc2 in the second display time ΔT2 is set at 2:1, it is necessary to make the transparency amount of change dc2 in the second display time ΔT2 2%, and the first display time ΔT1=25dt, and the second display time ΔT2=50dt, and the whole display time is 75dt.

Third Embodiment

In the second embodiment, the unit time dt (that is, the time dt when transparency is held constant) may be changed. For example, the unit time dt may be changed into dt'=⅘dt. In such a case, the first display time ΔT1=20dt, and the second display time ΔT2=40dt, and the whole display time is 60dt. By doing so, it is possible to meet needs of making the length of the pseudo-video (the display time) the same even if the transparency amount of change dc is changed.

Forth Embodiment

If a certain object is photographed and the first still image, the second still image and the third still image are obtained in its photograph order, the respective display times are indicated by the following equation.

$$\Delta T1 = (100/dc1)dt$$

$$\Delta T2 = (100/dc2)dt$$

$$\Delta T3 = (100/dc3)dt$$

$$\ldots \qquad [\text{Equation 14}]$$

wherein the time for displaying the first pseudo-video wherein the indication is gradually switched from the first still image into the second still image is the first display time ΔT1, the time for displaying the second pseudo-video wherein the indication is gradually switched from the second still image into the third still image is the second display time ΔT2, the time for displaying the third pseudo-video wherein the indication is gradually switched from the third still image into the fourth still image is the third display time ΔT3, . . . , the transparency amount of change in the first display time ΔT1 is dc1, the transparency amount of change in the second display time ΔT2 is dc2, the transparency amount of change in the third display time ΔT3 is dc3, a unit time is dt, and the transparency of any one of still images in each display time is changed from 0% to 100%.

If the photography time lag between the photography time of the first still image and the photography time of the second still image is Δt1, the photography time lag between the photography time of the second still image and the photography time of the third still image is Δt2, and the photography time lag between the photography time of the third still image and the photography time of the fourth still image is Δt3, . . . , $$1/dc2 = \Delta t2/(dc1 * \Delta t1)$$

$$1/dc3 = \Delta t3/(dc1 * \Delta t1)$$

$$\ldots \qquad [\text{Equation 16}]$$

with $$\Delta T1:\Delta T2 = \Delta t1:\Delta t2$$

$$\Delta T1:\Delta T3 = \Delta t1:\Delta t3$$

$$\ldots \qquad [\text{Equation 15}]$$

Then, the whole display time T when combining the above-mentioned pseudo-videos is represented by the following equation.

$$T = \Delta T1 + \Delta T2 + \Delta T3 + \ldots \qquad [\text{Equation 17}]$$
$$= (100/dc1)dt + (100/dc2)dt + (100/dc3)dt + \ldots$$
$$= 100 * dt * \{1/dc1 + \Delta t2/(dc1 * \Delta t1) + \Delta t3/$$
$$(dc1 * \Delta t1) + \ldots\}$$
$$= (\Delta t1 + \Delta t2 + \Delta t3 + \ldots) * 100 * dt/(dc1 * \Delta t1)$$

Even if the transparency amount of change dc1 is changed in another amount dc1' and the unit time dt is changed into another time dt', the whole display time is the same as shown below.

$$T' = (\Delta t1 + \Delta t2 + \Delta t3 + \ldots) * 100 * dt'/(dc1' * \Delta t1) \qquad [\text{Equation 19}]$$
$$= (\Delta t1 + \Delta t2 + \Delta t3 + \ldots) * 100 * (dc1'/dc1)$$
$$dt/(dc1' * \Delta t1)$$
$$= (\Delta t1 + \Delta t2 + \Delta t3 + \ldots) * 100 * dt/(dc1 * \Delta t1)$$
$$= T$$

if the below mentioned equation meets.

$$dt' = (dc1'/dc1)dt \qquad [\text{Equation 18}]$$

EXPLANATION OF REFERENCE NUMBERS

1 . . . pseudo-video creation device
2 . . . image data storage
3 . . . pseudo-video creator
4 . . . time data storage
5 . . . time lag computer
6 . . . display time computer
7 . . . change designator

The invention claimed is:

1. A pseudo-video creation device that creates pseudo-video showing change of an object with a passage of time, a photograph time lag Δt, with two or more still images obtained by taking the same object at different times, comprising:
   an image data storage that stores the two or more still images of the object as an image data;
   a pseudo-video creator that creates the pseudo-video in such a manner that upon receiving the image data from the image data storage, the other still image is displayed so as to be superimposed on top of one still image and change its transparency by a predetermined transparency amount of change whenever a predetermined time passes;
   a change designator that designates the transparency amount of change; and
   a display time computer that computes display time ΔT of the pseudo-video by the following Equation 1

$$\Delta T \approx k \Delta t$$

wherein k is a constant;
   wherein photograph time lag Δt is a difference between photography time of one still image and photography time of the other still image, and the change designator designates the transparency amount of change so that the time from the change start to the change end of the transparency of the other still image almost corresponds with the display time ΔT computed through the display time computer.

2. The pseudo-video creation device according to claim 1, wherein the transparency amount of change is set almost constant between change start and change end of the transparency of the other still image.

3. The pseudo-video creation device according to claim 1, further comprising:
   a time data storage that stores photography time of each still image as time data; and
   a time lag computer that computes the photography time lag Δt based upon the time data stored in the time data storage;
   wherein the display time computer computes the display time ΔT of the pseudo-video based upon the photography time lag Δt computed through the time lag computer.

4. The pseudo-video creation device according to claim 1, wherein if the two or more still images are referred to as first still image, second still image and third still image in the photography order, the pseudo video creator creates the first pseudo-video in which the first still image is gradually switched into the second still image in such a manner that the other still image is displayed, being superimposed on top of one of the first still image and the second still image and varying the transparency, and the second pseudo-video in which the second still image is gradually switched into the third still image in such a manner that the other still image is displayed, being superimposed on top of one of the second still image and the third still image and varying the transparency; and
   the display time computer computes the first display time ΔT1 that is the display time of the first pseudo-video and the second display time ΔT2 that is the display time of the second pseudo-video so as to meet the following Equation 2

$$\Delta T1 : \Delta T2 \approx \Delta t1 : \Delta t2$$

wherein Δt1 is a photography time lag between the photography time of the first still image and the photography time of the second still image, and
   Δt2 is a photography time lag between the photography time of the second still image and the photography time of the third still image.

5. A pseudo-video creation method of creating pseudo-video showing change of an object with passage of time with two or more still images obtained by taking the same object at different times, comprising:
   a step of storing the two or more still images as image data;
   a step of creating the pseudo-video in such a manner that with the stored image data, the other still image is displayed, being superimposed on top of one still image and changing its transparency by a predetermined amount equal to the transparency amount of change whenever a predetermined time passes;
   a step of designating the transparency amount of change; and
   a step of computing the display time ΔT of the pseudo-video by the following Equation 3 if the photography time lag Δt that is the different between the photography time of one still image and the photography time of the other still image Equation 3

$$\Delta T \approx k \Delta t$$

wherein k is a constant; and
   wherein the transparency amount of change is designated so that the time from the change start and the change end of the transparency of the other still image almost corresponds with the computed display time ΔT.

6. The pseudo-video creation method according to claim 5, wherein the transparency amount of change is set almost constant between change start and change end of the transparency of the other still image.

7. The pseudo-video creation method according to claim 5, further comprising a step of storing the photography time of each still image as time data, and a step of computing the photography time lag Δt based upon the stored time data, wherein the display time ΔT is computed based upon the computed photography time lag Δt.

8. The pseudo-video creation method according to claim 5, wherein if the two or more still images are referred to as first still image, second still image and third still image in the photography order, in the step of creating the pseudo video, a first pseudo-video in which the first still image is gradually switched into the second still image is created in such a manner that the other still image is displayed, being superimposed on top of one of the first still image and the second still image and varying the transparency, and the second pseudo-video in which the second still image is gradually switched into the third still image is created in such a manner that the other still image is displayed, being superimposed on top of one of the second still image and the third still image and varying the transparency; and
   in the step of computing the display time, the first display time ΔT1 that is the display time of the first pseudo-video and the second display time ΔT2 that is the display time of the second pseudo-video are computed so as to meet the following Equation 4

$$\Delta T1 : \Delta T2 \approx \Delta t1 : \Delta t2$$

wherein Δt1 is a photography time lag between the photography time of the first still image and the photography time of the second still image, and Δt2 is a photography time lag between the photography time of the second still image and the photography time of the third still image.

9. Pseudo-video creation program that creates pseudo-video showing change of an object with passage of time, a photography time lag Δt, with two or more still images obtained by taking the same object at different times: wherein the pseudo-video creation program gets a computer to function as follows:

an image data storage that stores the two or more still images of the object as an image data;

a pseudo-video creator that creates the pseudo-video in such a manner that upon receiving image data from the image data storage, the other still image is displayed, being superimposed on top of one still image and changing its transparency by predetermined transparency amount of change whenever a predetermined time passes;

a change designator that designates the transparency amount of change; and a display time computer that computes display time ΔT of the pseudo-video by the following Equation 5

$$\Delta T \approx k \Delta t$$

wherein k is a constant, and wherein the photograph time lag Δt is a difference between photography time of one still image and photography time of the other still image, the change designator designates the transparency amount of change so that the time from the change start to the change end of the transparency of the other still image almost corresponds with the display time ΔT computed through the display time computer.

10. The pseudo-video creation program according to claim 9, wherein the transparency amount of change is set almost constant between change start and change end of the transparency of the other still image.

11. The pseudo-video creation program according to claim 9, further getting the computer to function as a time data storage that stores photography time of each still image as time data; and a time lag computer that computes the photography time lag Δt based upon the time data stored in the time data storage;

wherein the display time computer computes the display time ΔT of the pseudo-video based upon the photography time lag Δt computed through the time lag computer.

12. The pseudo-video creation program according to claim 9, wherein if the two or more still images are referred to as first still image, second still image and third still image in the photography order, the pseudo video creator creates a first pseudo-video in which the first still image is gradually switched into the second still image in such a manner that the other still image is displayed, being superimposed on top of one of the first still image and the second still image and varying the transparency, and the second pseudo-video in which the second still image is gradually switched into the third still image in such a manner that the other still image is displayed, being superimposed on top of one of the second still image and the third still image and varying the transparency; and the display time computer computes the first display time ΔT1 that is the display time of the first pseudo-video and the second display time ΔT2 that is the display time of the second pseudo-video so as to meet the following Equation 6

$$\Delta T1 : \Delta T2 \approx \Delta t1 : \Delta t2$$

wherein Δt1 is a photography time lag between the photography time of the first still image and the photography time of the second still image, and Δt2 is a photography time lag between the photography time of the second still image and the photography time of the third still image.

* * * * *